May 29, 1956  J. E. BOYTIM ET AL  2,747,408
ELECTRICAL PRESSURE CELL TRANSDUCER
Filed July 2, 1953
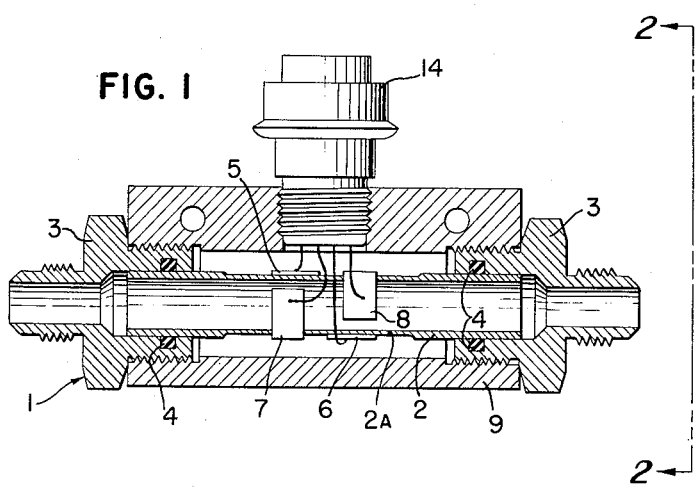
FIG. 1
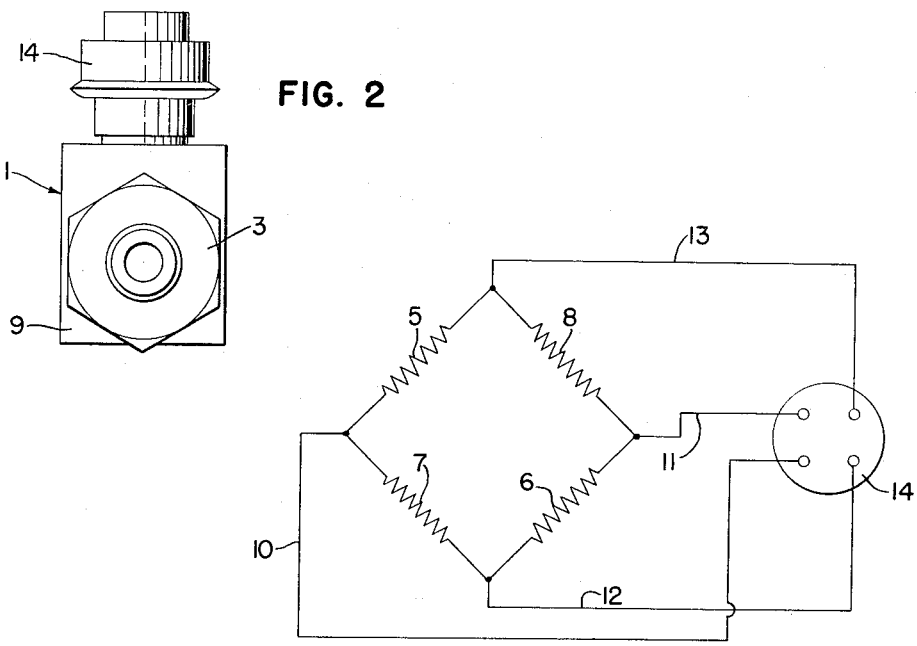
FIG. 2
FIG. 3
INVENTOR.
HOWARD A. JONARD
JOHN E. BOYTIM
BY
R. L. Miller
ATTORNEY United States Patent Office 2,747,408
Patented May 29, 1956

2,747,408

ELECTRICAL PRESSURE CELL TRANSDUCER

John E. Boytim and Howard A. Jonard, Akron, Ohio, assignors, by mesne assignments, to The Goodyear Tire & Rubber Company, a corporation of Ohio Application July 2, 1953, Serial No. 365,744

4 Claims. (Cl. 73—398)

This invention relates to fluid pressure measuring means, especially to an electrical cell transducer employing resistance wire strain gauges.

Heretofore there have been various fluid pressure measuring means developed which include reistance wire strain gauges. Such pressure measuring means have usually included some type of a pressure sensitive tube for receiving the fluid under pressure so that the pressure on the fluid can be measured in the apparatus of the invention. It also is thought that most of the apparatus provided has not had the quite high safety factor desirable in pressure testing operations, and the pressure-sensitive tube used in prior apparatus has normally been fixedly positioned in the pressure testing means so that all forces applied thereto had to be measured as bursting or tensional forces. Furthermore, some of such pressure cells and pressure measuring means have not had the extreme accuracy that is desired in pressure testing apparatus regardless of whether rather high or low pressures are being measured.

The general object of the present invention is to provide a new type of an electrical pressure cell transducer which is characterized by the use of a pressure-sensitive tube in the apparatus and with such tube being positioned in housing and positioning means provided therefore in a floating manner free for limited longitudinal movement in its housing and positioning means.

Another object of the invention is to provide a pressure cell using electrical strain gauges which are connected to compensate for temperature changes automatically.

Another object of the invention is to position the pressure sensitive tube in the apparatus free from external mechanical or assembly strains and to provide for end loading of compressive strains on such tube and circumferential loading of tensional strains.

Yet another object of the invention is to provide both compression measuring resistance wire strain gauges and tension measuring gauges in the apparatus, with the compression gauge extending longitudinally of the pressure sensitive tube and with the tensional gauge extending around a portion of the circumference of the tube.

Yet another object of the invention is to provide an electrical tranducer which is very safe to use even at a high pressure and which transducer is of relatively uncomplicated, inexpensive construction.

The foregoing and other objects and advantages of the invention will be made more apparent as the specification proceeds.

For a better understanding of the invention, reference should be had to the accompanying drawings, wherein:

Fig. 1 is a longitudinal vertical section through an electrical transducer embodying the principles of the invention;

Fig. 2 is an end elevation taken on line 2—2 of Fig 1; and

Fig. 3 is an electrical circuit diagram of the transducer of the invention.

The present invention relates to an electrical transducer wherein a housing is provided that has a center bore therein, pressure couplings at opposite ends of the housing connecting to the center bore thereof, a tube sealed in the center bore of the housing but freely positioned therein for longitudinal movement, and at least a pair of strain gauges secured to the tube on the outer surface thereof. One of the strain gauges used is a tension gauge and the other strain gauge is a compression gauge. Electrical connecting means are secured to and connect the strain gauges together in a bridge circuit and extend from the bridge circuit for connection to suitable energizing and measuring means used with the transducer.

With reference to the details of the structure shown in the drawings, an electrical transducer is shown and is indicated as a whole by the numeral 1. This electrical transducer 1 comprises a pressure-sensitive tube 2 the ends of which are in sealed connection or engagement with standard couplings 3 which are used to connect fluid supply and exhaust lines thereto for transmittal of fluids under pressure to the transducer 1 to have the pressures of such fluids measured in the transducer. The couplings 3, as a feature of the invention, engage with the outer surfaces only of the tube 2 by suitable sealing means, such as O-rings 4, so that a sealed connection exists between the couplings and the tube, but with the ends of the tube 2 being exposed within the coupling for application of pressures thereto, as hereinafter described in more detail.

At least certain of the advantages of the invention are achieved when one end of the tube 2 is fixed and is or is not subjected to the fluid under pressure.

Fig. 1 of the drawings clearly shows that a portion of the tube 2, indicated at 2a, is preferably of selectively reduced thickness to provide a pressure-sensitive area in the tube and a plurality of resistance wire strain gauges are suitably cemented to the surface of the tube 2 in the portion 2a thereof. Thus a pair of axially directed compression strain gauges 5 and 6 are secured, for example, but not necessarily to substantially diametrically opposed portions of the tube 2 at axially spaced parts of the tube, whereas a pair of circumferentially directed tensional resistance wire strain gauges 7 and 8 are secured to the periphery of the tube 2 with one wire strain gauge 7 being, for example, but not necessarily aligned circumferentially with one of the compression gauges 5 and with the second tensional strain gauge 8 being, for example, but not necessarily aligned circumferentially with the second compression strain gauge 6. It also will be noted that the pair of gauges 5 and 7 are usually spaced axially of the tube from the other pair of strain gauges 6 and 8.

Although the gauges 5, 6, 7 and 8 are ordinarily bonded to the tube 2, as by cementing them in place on the tube, it is also possible to have the strain gauge wires unbonded in relation to the tube but wrapped or otherwise mounted on the tube in strain responsive relation therewith. Also, the position of the gauges on the tube is not important as long as each pair of gauges are at 90° to each other, with the compression gauge being positioned to respond to longitudinal compression, and the tension gauge being positioned to respond to circumferential tension. Positioning the gauges as particularly described above has been done to satisfy concentricity and equal material thickness.

In order to provide a desired secondary safety enclosure around the sensitive pressure receiving and frangible portions of the tube 2, a suitable housing 9 engages the axially inner ends of the couplings 3 and extends therebetween in radially spaced relation to the tube 2 so that such tube is completely confined in the reduced thickness wall area 2a thereof.

In one type of a transducer built heretofore, and particularly designed to be sensitive in compression, and used for measuring up to 500 pounds per square inch pressure, typical values for the various resistance wires strain gauges are: the circumferentially extending tension type strain gauges 7 and 8 read at 320 microinches tension; the longitudinal or compression type strain gauges 5 and 6 read at 480 microinches compression. Thus, the total four legs of the bridge formed by connecting the resistance strain wire gauges together was 1600 microinches, or 3.2 microinches/p. s. i.

A more usual and preferred design is to have the strain gauges substantially equal in tension and compression. In a recent design of the tube 2, the tension strain gauges were 100 microinches and the compression strain gauges were 103 microinches for 100/p. s. i. resulting in a total in the four legs of the bridge of 406 microinches or 4.06 microinches/p. s. i.

Fig. 3 best indicates that the resistance wire strain gauges of the invention are connected to form a Wheatstone bridge circuit by wires extending between the various gauges of the invention. Furthermore, such wires and Wheatstone bridge formed therefrom is provided with two input leads 10 and 11 connecting to opposed portions on the bridge intermediate the compression and tension gauges connected to form each leg of the bridge. Any suitable D. C. voltage is impressed across the input leads 10 and 11 to supply power to the strain gauges 5, 6, 7 and 8. Output leads 12 and 13 are connected to the other opposed terminals of the Wheatstone bridge formed by the strain gauges for transmittal of the output current to suitable means, such as a galvanometer, by way of an outlet or electrical connector plug 14 usually carried by and secured to the housing 9.

It will be recognized that other indicating or response circuits of known type may be employed instead of the Wheatstone bridge and galvanometer circuit described, such as an A. C. carrier amplifier system, an A. C. dynamic amplifier system, etc.

Fig. 3 of the drawings shows that a strain gauge forms each leg of the bridge. In some cases, one tension and one compression gauge will be used, rather than the four gauges as shown, and the other two legs of the bridge will be supplied by a pair of fixed resistances in known fashion. By the connection of input voltages to the center portions of the bridge, and taking the readings from the ends of the bridge, all temperature compensation is automatically taken into consideration by the fixedly positioned center portions of the bridge and the relative movements of the strain gauges with relation thereto.

It will be appreciated that the output from the plug 14 can be connected to any desired type of galvanometer, amplifiers, recording oscillograph, or indicator, as desired to measure or indicate the pressure of fluid within the tube 2.

The gauge of the invention is of sensitive but relatively inexpensive construction and gives accurate measurements over long periods of time substantially without maintenance and substantially independent of temperature so that the objects of the invention have been achieved.

The sensitivity of the improved gauge is the result of the combination of end loading producing compression strains and radial loading producing circumferential tension strains. The end loading producing compressive strains on the tube is a function of fluid pressure in the tube and the compressive strains can be calibrated in terms of pressure. By increasing or decreasing the area of loading at the end or ends of the tube, by increasing or decreasing the thinness of the reduced wall 2a of the tube, and by increasing or decreasing the diameter of the tube my gauge can be adapted to a wide variety of sensitivities and pressures. But particularly, the relation of wall thickness at the ends of the tube with respect to the wall thickness at the center controls sensitivity of the tube under endwise compression, which is a function of pressure, and which is a unique and important function of the invention. Moreover, it has been determined that the gauge of the invention has a high frequency response, is accurate under high "G" loadings, has the secondary safety enclosure of the housing 9, has low displacement, and can be put directly in a line.

While a certain representative embodiment and details have been shown for the purpose of illustrating the invention, it will be apparent to those skilled in this art that various changes and modifications may be made therein without departing from the spirit or scope of the invention.

We claim:

1. An electrical transducer comprising a tube having a reduced wall thickness pressure sensitive length intermediate the ends thereof, coupling means engaging opposite ends of the outer walls of said tube, sealing means engaging said tube with said coupling means and leaving the ends of said tube free for longitudinal compressive movement and exposing the ends walls of said tube for application of compressive fluid forces thereto, a safety enclosure surrounding said tube intermediate said coupling means, a plurality of resistance wire strain gauges carried by said tube at spaced portions thereof, and electrical connection means carried by said safety enclosure and connecting to said strain gauges.

2. An electrical transducer comprising a pressure sensitive tube, coupling means engaging the outer walls of the opposite ends of said tube by fluid tight connections, said coupling means positioning said tube for slight longitudinal compressive movement from the ends towards the center and exposing the end walls of said tube for application of compressive fluid pressure thereto, a safety enclosure surrounding said tube intermediate said coupling means, at least a pair of resistance wire strain gauges carried by said tube at axially and circumferentially spaced portions thereof, and electrical connection means carried by said safety enclosure and connecting to said strain gauges.

3. An electrical transducer comprising a pressure sensitive tube, coupling means engaging the outer walls of opposite ends of said tube, said coupling means permitting longitudinal compressive movement from the ends towards the middle of said tube and exposing the end walls of said tube for application of compressive forces thereto, two compression and two tension resistance wire strain gauges carried by said tube and connected as a Wheatstone bridge with one compression and one tension gauge in each leg of the bridge, and electrical means connecting to said strain gauges for flow of electrical current therethrough.

4. A pressure gauge including a tube, means for supplying fluid pressure inside the tube in a direction to expand it circumferentially, housing means fully surrounding the tube and connected to the means supplying fluid pressure so as to apply fluid pressure on the tube in a direction to compress it longitudinally, electric means mounted on the tube and compressed when the tube is compressed, electric means mounted on the tube which means are stretched when the tube is expanded, and means connecting the electric means in a temperature compensated electric circuit to provide an indication of the stresses occuring in the tube due to fluid pressure.

References Cited in the file of this patent

UNITED STATES PATENTS

| | | |
|---|---|---|
| 2,420,148 | Ostergren | May 6, 1947 |
| 2,421,907 | Postlewaite | June 10, 1947 |
| 2,472,045 | Gibbons | May 31, 1949 |
| 2,509,421 | Carter | May 30, 1950 |
| 2,637,210 | Hathaway | May 5, 1953 |